E. A. HENSAL.
NON-SKID DEVICE.
APPLICATION FILED AUG. 11, 1919.
1,346,785.
Patented July 13, 1920.
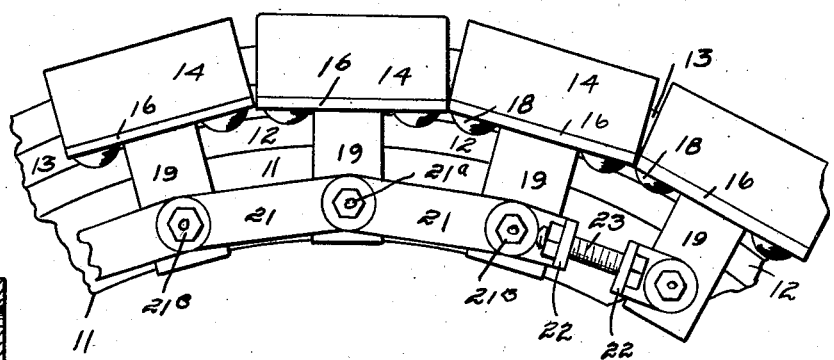
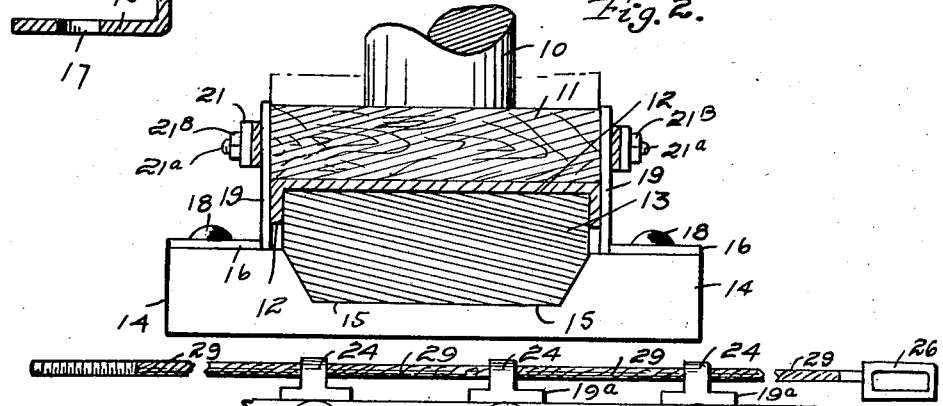
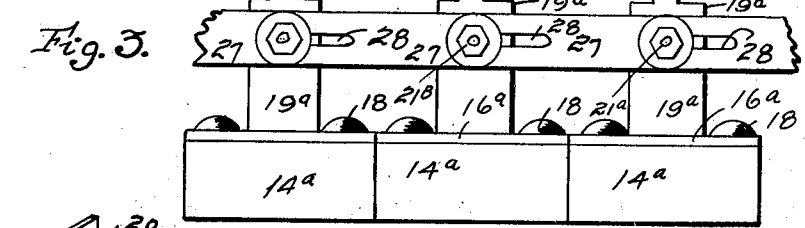
Inventor
Elmer A. Hensal

UNITED STATES PATENT OFFICE.

ELMER A. HENSAL, OF PANORA, IOWA.

NON-SKID DEVICE.

1,346,785.  Specification of Letters Patent.  Patented July 13, 1920.

Application filed August 11, 1919. Serial No. 316,899.

*To all whom it may concern:*

Be it known that I, ELMER A. HENSAL, a citizen of the United States, and a resident of Panora, in the county of Guthrie and State of Iowa, have invented a certain new and useful Non-Skid Device, of which the following is a specification.

The object of my invention is to provide a non-skid of simple, durable and inexpensive construction.

More particularly it is my object to provide a non-skid device comprising a series of tread plates or members designed to fit over a tire, and to provide means for successively flexibly connecting the tread members together, said tread members being substantially wider than the wheel.

A further object is to provide such a device which may be put on the car as an attachment for furnishing a broader tread than the wheel ordinarily has.

With these and other objects in view my invention consists in the construction, arrangement and combination of the various parts of the device whereby the objects contemplated are attained, as hereinafter more fully set forth, pointed out in my claim and illustrated in the accompanying drawings, in which:

Figure 1 shows a side elevation of a portion of a wheel with a tire thereon equipped with a non-skid device embodying my invention.

Fig. 2 shows a transverse, vertical, sectional view through the rim and tire with my non-skid device installed thereon.

Fig. 3 shows a side elevation of a portion of a modified form of a non-skid device.

Fig. 4 shows a detail, perspective view of a portion of a non-skid device; and

Fig. 5 shows a sectional view through one of the bracket members.

In the accompanying drawings, I have used the reference numeral 10 to indicate generally the spoke of a wheel which has the felly 11, the rim 12 and the cushion tire 13.

In Figs. 1 and 2 I have shown one form of my invention and in Fig. 3 another form.

In the form of my invention illustrated in Figs. 1 and 2 I have shown a series of tread members 14 each extending transversely across the tread of the tire, and having on its inner surface a socket or recess 15 designed to fit over the tire.

Fixed to the inner surface of each tread member 14 at the opposite ends thereof, are brackets comprising metal plates 16 having holes 17 to receive bolts or screws or the like 18 by which said brackets are fastened to the tread members 14.

Each bracket has secured to the plate 16 an extension strip 19 extending radially inwardly adjacent to the rim and felly as illustrated in Fig. 2.

Adjacent to the inner end of each extension strip 19 is a laterally extending spindle or the like 20.

The tread members are successively linked together around the wheel on each side thereof by means of links 21 which are mounted on the spindles 20 and are held in position by means of bolts $21^a$ and nuts $21^b$.

Two of the adjacent links 21 have laterally extending flanges 22 designed to receive a bolt 23 by which the series of links on one side of the wheel may be adjustably fastened in a continuous annular member.

It has been my purpose to provide essentially a non-skid device, and also a traction device whereby a broad tread may be furnished to a truck or motor vehicle for traveling in mud or sand or the like.

It is sometimes desirable that the non-skid device be detached from the wheel and laid out flat, forming a track over which the wheels may travel in getting out of a mud hole or the like.

In Fig. 3 I have shown a form of my invention peculiarly adapted for the use just mentioned.

In the form of the device shown in Fig. 3 I employ tread members $14^a$ similar to the tread members 14. I employ bracket members having a plate $16^a$ similar to the plates 16, and extensions $19^a$ similar to the extensions 19. The inner ends of the extensions $19^a$ are provided with loops 24. The loops 24 are arranged so that their openings are adapted to receive a continuous cable 29.

The ends of each cable 29 are connected together by means of a turn-buckle 26.

In the form of my invention shown in Fig. 3 I provide links 27 similar to the links 21, with the exception that each link 27 has at least at one end a longitudinally elongated opening 28. The successive links are mounted on the spindles 20, and it will be seen that the links may slide on said spindles.

After the device has been loosely installed on the wheel, the turn-buckle 26 is manipulated for tightening the cable 29 for holding the non-skid device in a proper circle.

If it is desired to remove the form of invention shown in Fig. 3 from the wheel, for the purpose of laying the non-skid device out flat in front of the wheel for furnishing a suitable track over which the vehicle wheels may travel in getting out of a mud hole or the like, the turn-buckles are un-screwed, and on account of the use of the slots 28 the tread members 14 may be laid flat on the ground as shown in Fig. 3.

The advantages of a structure such as that herein shown may be largely seen from the foregoing description.

The parts are of simple and durable construction. The non-skid device may be quickly and easily installed on or removed from the wheel.

My device does not impose any excessive wear or friction on the tire.

The use of my device reduces skidding to a minimum, and also furnishes a broad tread for securing maximum traction. Some changes may be made in the construction and arrangement of the parts of my non-skid device without departing from the essential features and purposes of my invention, and it is my intention to cover by my claim any modified forms of structure or use of mechanical equivalents which may be reasonably included within the scope of my claim.

I claim as my invention:

In a non-skid device, a series of tread members arranged successively circumferentially around the tread portion of a tire, said tread members each having a recess formed on their inner surface, the recess being designed to receive the tread portion of the tire and thus prevent lateral movement of the tread member relative to the tire, each of said tread members being provided with spaced members arranged to extend radially inwardly on the opposite sides of a tire, said spaced members each having loops formed on their inner ends, links for pivotally and slidably connecting said members on each side of a tire together, said links having elongated slots for allowing limited movement of the parts, a cable on each side of the wheel adapted to be received in said loops, whereby the tightening of said cable will draw the inner ends of said spaced members closer together and thus hold the tread device onto the tread portion of a tire.

Des Moines, Iowa, July 11, 1919.

ELMER A. HENSAL.